Patented Oct. 23, 1923.

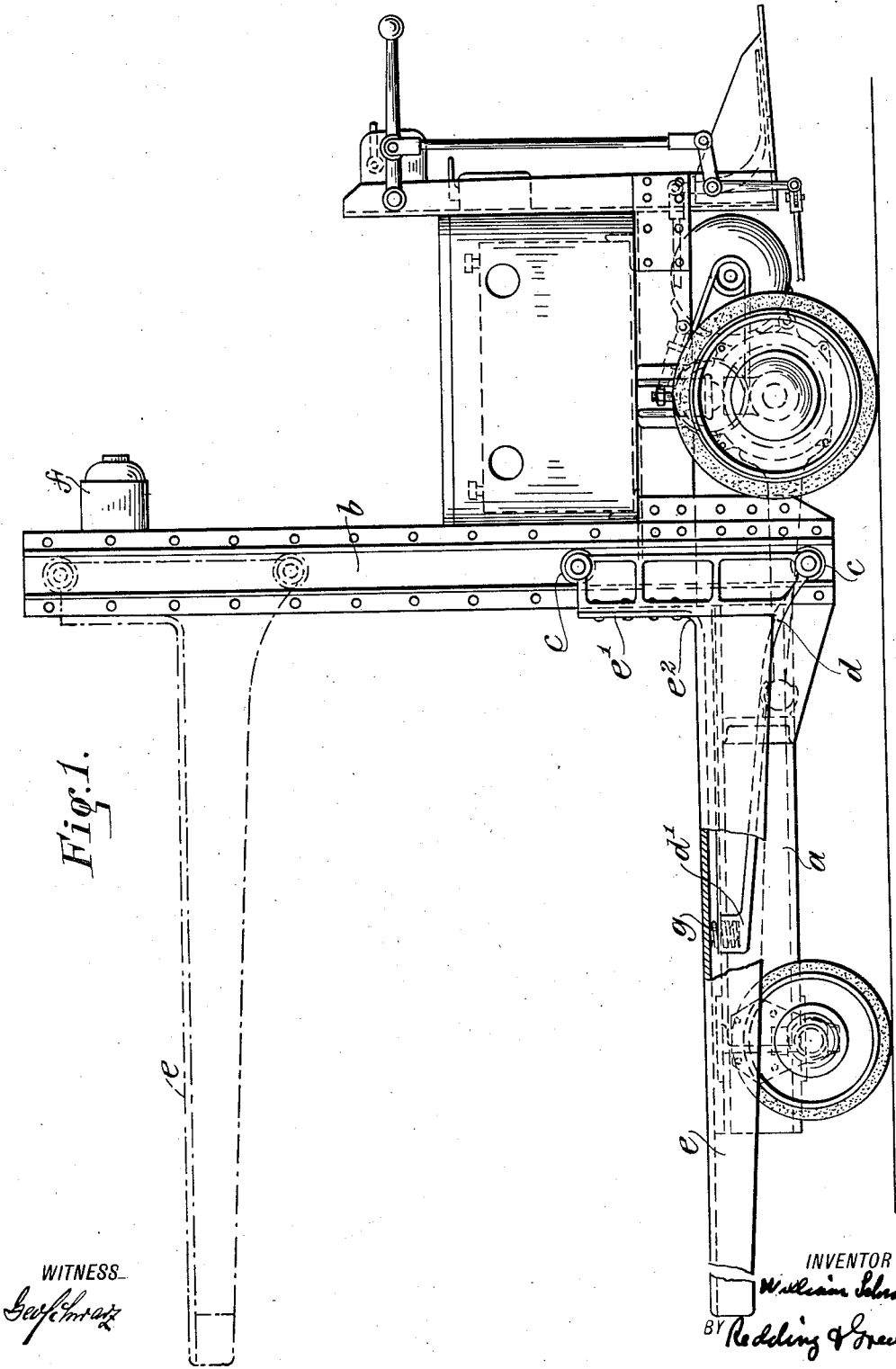

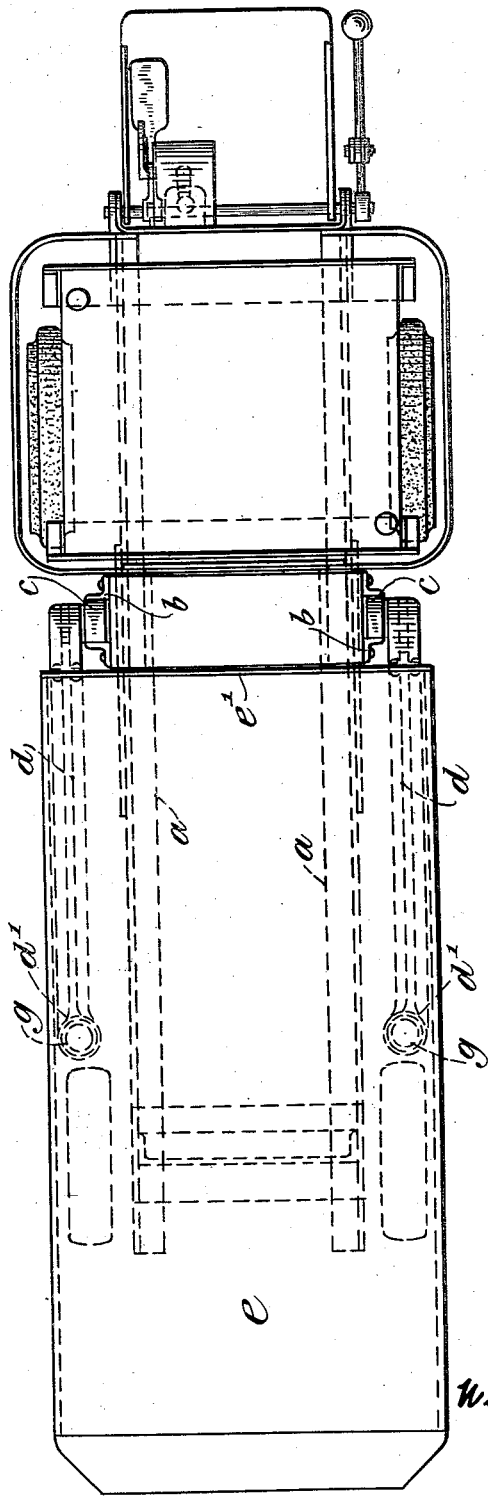

1,471,709

UNITED STATES PATENT OFFICE.

WILLIAM SCHROEDER, JR., OF BROOKLYN, NEW YORK.

INDUSTRIAL TRUCK.

Original application filed September 17, 1921, Serial No. 501,287. Divided and this application filed June 29, 1922. Serial No. 571,643.

*To all whom it may concern:*

Be it known that I, WILLIAM SCHROEDER, Jr., a citizen of the United States, residing in the borough of Brooklyn, of the city of New York, in the State of New York, have invented certain new and useful Improvements in Industrial Trucks, of which the following is a specification, reference being had to the accompanying drawings forming a part hereof.

The present application constitutes a division of application Ser. No. 501,287, filed by the present applicant on September 17, 1921.

The principal object of the present invention is to provide in an industrial truck of the elevating platform type a novel support for the platform by means of which load shocks are absorbed. More particularly, the invention has to do with an industrial truck of the character indicated in which the platform is supported through a cantilever suspension. In this type of suspension it is well known that load shocks are multiplied tremendously and subject the supporting frame and trackways to such severe stresses as will materially shorten the life and usefulness of the truck. In accordance with the present invention it is proposed to relieve this condition to the greatest degree possible by mounting the platform yieldingly on the supporting frame and interposing between the frame and platform shock absorbing elements such as springs.

A further object of the invention is to construct a platform which will lend itself to the improved means of support by a construction which shall be simple and inexpensive and thoroughly practical to manufacture.

Other objects and advantages of the invention will appear with greater particularity hereinafter in connection with the detailed description of the illustrated embodiment shown in the drawings wherein:

Figure 1 is a view in side elevation of an improved industrial truck in which the improvements are incorporated, a portion of the platform being broken away to show the yielding support therefor.

Figure 2 is a view in plan of the truck shown in Figure 1.

While the invention is not to be limited to the details of construction of the truck chassis and the means employed in supporting the platform one suitable type of truck is illustrated by way of example in the drawings. As there shown, the chassis of the truck includes longitudinally extending side frame members $a$ at each side to support the vertical tracks $b$ in which move the rollers $c$ of the supporting carriage for the frame $d$ on which the load platform $e$ is supported. A hoisting motor $f$ for the frame $d$ is indicated in the drawings although the invention is not limited to the use of power for elevating the platform nor, indeed, to a cantilever suspension therefor although the present improvements will be of particular advantage in a truck having such elements.

In the cantilever suspension illustrated it will be evident that stresses imposed on any part of the chassis will be transmitted to the platform and multiplied to such a substantial degree as to react to a disadvantageous extent on all of the elements by which the platform is carried. The problem presented is to resist and absorb these stresses before they are impressed fully upon the load platform $e$. To relieve the condition to the greatest degree possible it is proposed to mount the platform $e$ on the frame $d$ yieldingly. To this end, the frame may have cast therein spring seats $d'$ in which are carried springs $g$ on which the platform $e$ rests. This platform is preferably made from pressed metal and has its end $e'$ upturned to conform to the frame $d$. The line of bend indicated roughly at $a^2$ will permit sufficient flexion for the platform $e$ to accommodate itself to a shock absorbing yielding support although it is obvious that this platform might be hingedly secured to the frame $d$ adjacent its front edge. In either event, load shocks on the cantilever support will be absorbed to a great degree and the strain and stresses correspondingly diminished.

The parts described, it will be observed are simple and inexpensive to manufacture, easy to assemble and thoroughly efficient in use, providing a desirable degree of flexibility and absorption of destructive stresses. Changes in details of construction may be made without departing from the spirit of the invention provided the modifications fall within the scope of the appended claims.

What I claim is:

1. In an industrial truck, a platform, a cantilever support therefor and means to mount the platform yieldingly on the cantilever support.

2. In an industrial truck, a platform, a cantilever support therefor and means to mount the platform yieldingly.

3. In an industrial truck in combination with vertical trackways, rollers running therein, a cantilever frame carried with the rollers, a platform mounted on the cantilever frame adapted to flex adjacent its inner edge and springs interposed between the frame and the platform to support the latter yieldingly.

This specification signed this 28th day of June A. D. 1922.

WILLIAM SCHROEDER, Jr.